(12) United States Patent
Ha et al.

(10) Patent No.: US 12,241,870 B2
(45) Date of Patent: Mar. 4, 2025

(54) ULTRASONIC NON-DESTRUCTIVE TEST METHOD AND SYSTEM USING DEEP LEARNING, AND AUTO-ENCODER-BASED PREDICTION MODEL TRAINING METHOD USED THEREFOR

(71) Applicant: KOREA RESEARCH INSTITUTE OF STANDARDS AND SCIENCE, Daejeon (KR)

(72) Inventors: Jong Moon Ha, Daejeon (KR); Won Jae Choi, Daejeon (KR); Hong Min Seung, Daejeon (KR)

(73) Assignee: KOREA RESEARCH INSTITUTE OF STANDARDS AND SCIENCE, Daejeon (KR)

( * ) Notice: Subject to any disclaimer, the term of this patent is extended or adjusted under 35 U.S.C. 154(b) by 0 days.

(21) Appl. No.: 17/776,909

(22) PCT Filed: Apr. 4, 2022

(86) PCT No.: PCT/KR2022/004811
§ 371 (c)(1),
(2) Date: May 13, 2022

(87) PCT Pub. No.: WO2022/234957
PCT Pub. Date: Nov. 10, 2022

(65) Prior Publication Data
US 2024/0053302 A1    Feb. 15, 2024

(30) Foreign Application Priority Data

May 3, 2021  (KR) .................. 10-2021-0057220

(51) Int. Cl.
*G01N 29/44*     (2006.01)
*G01N 29/024*    (2006.01)
(Continued)

(52) U.S. Cl.
CPC ....... *G01N 29/4472* (2013.01); *G01N 29/024* (2013.01); *G06N 3/0455* (2023.01);
(Continued)

(58) Field of Classification Search
CPC ............ G01N 29/4472; G01N 29/024; G01N 2291/011; G01N 2291/023;
(Continued)

(56) References Cited

FOREIGN PATENT DOCUMENTS

| CN | 109598287 A | * | 4/2019 | ........... G06K 9/6268 |
| JP | 07-005155 A | | 1/1995 | |

(Continued)

OTHER PUBLICATIONS

A. Hendriksen, et al"Noise2Inverse: Self-supervised deep convolutional denoising for tomography", IEEE Trsactions on Computational Imaging. vol. X. No. Y. Month Year.2020 (Year: 2020).*

(Continued)

*Primary Examiner* — Eman A Alkafawi
*Assistant Examiner* — Dilara Sultana
(74) *Attorney, Agent, or Firm* — DILWORTH IP, LLC

(57) ABSTRACT

An ultrasonic NDT method and system, which can extract and analyze a defect signal even when a signal reflected from a defect interferes with a unique initial pulse of an ultrasonic transducer or a signal reflected from the surface of a test object, and an autoencoder-based prediction model training method used therefor. The method may include acquiring a measured signal by transmitting an ultrasonic wave to a test object and receiving an ultrasonic wave reflected from the test object; inputting the measured signal to an autoencoder-based prediction model and predicting a reference signal which is to be expected to be measured from a test object with no defect; calculating a residual signal as the absolute value of a difference between the measured (Continued)

signal and the reference signal; and analyzing information on a defect contained in the test object by analyzing the residual signal.

8 Claims, 10 Drawing Sheets

(51) Int. Cl.
  *G06N 3/0455* (2023.01)
  *G06N 3/08* (2023.01)
(52) U.S. Cl.
  CPC .......... *G06N 3/08* (2013.01); *G01N 2291/011* (2013.01); *G01N 2291/023* (2013.01); *G01N 2291/0289* (2013.01); *G01N 2291/101* (2013.01)
(58) Field of Classification Search
  CPC ..... G01N 2291/0289; G01N 2291/101; G01N 29/043; G01N 29/11; G01N 29/30; G01N 29/4427; G01N 29/4436; G01N 29/4445; G01N 29/4481; G01N 29/06; G01N 29/36; G01N 29/44; G01N 29/48; G01N 29/069; G01N 29/449; G06N 3/0455; G06N 3/08; Y02E 30/30
  See application file for complete search history.

(56) References Cited

FOREIGN PATENT DOCUMENTS

| JP | 2004-257971 A | | 9/2004 |
|---|---|---|---|
| JP | 2021004738 A | * | 1/2021 |
| KR | 10-0762502 B1 | | 10/2007 |
| KR | 10-2021-0038143 A | | 4/2021 |

OTHER PUBLICATIONS

B. Munir et al. "Performance enhancement of convolutional neural network for ultrasonic flaw classification by adopting autoencoder", NDT and E international, 111 (2020) 102218 (Year: 2020).*
A. Ma et al. "High Precision Detection Method for Delamination Defects in Carbon Fiber Composite Laminates Based on Ultrasonic Technique and Signal Correlation Algorithm". Materials (Basel). Aug. 31, 2020;13(17):3840. (Year: 2020).*
International Search Report from WIPO in Application No. PCT/KR2022/004811 dated Aug. 3, 2022, 3 pages.
Office Action from Korean Patent Office in the KR priority Application No. KR 10-2021-0057220 dated Aug. 10, 2022.
Yeo, et al., Pipe Leak Detection System using Wireless Acoustic Sensor Module and Deep Auto-Encoder, Journal of The Korea Society of Computer and Information, vol. 25 No. 2, pp. 59-66, Feb. 2020.
Pathirage, et al., Development and Application of a Deep Learning-Based Sparse Autoencoder Framework for Structural Damage Identification, Structural Health Monitoring, vol. 18 (I), pp. 103-122, 2018.

* cited by examiner

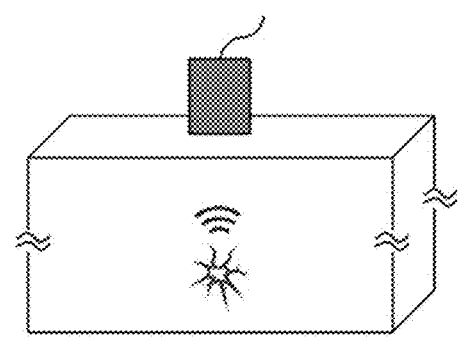
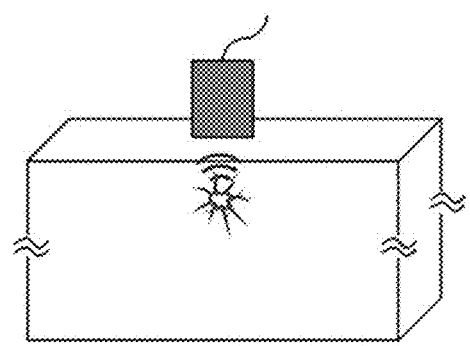
FIG. 1A
FIG. 1B $$\min_{\phi,\psi}\left[L(x_n)\right]$$

ULTRASONIC NON-DESTRUCTIVE TEST METHOD AND SYSTEM USING DEEP LEARNING, AND AUTO-ENCODER-BASED PREDICTION MODEL TRAINING METHOD USED THEREFOR

FIELD OF THE INVENTION

The present disclosure relates to an ultrasonic NDT (Non-Destructive Test) method and system using deep learning, and an autoencoder-based prediction model training method used therefor, and more particularly, to an ultrasonic NDT method and system, which can extract and analyze a defect signal even when a signal reflected from a defect interferes with an initial pulse based on the characteristic of an ultrasonic scanner or a signal reflected from the surface of a test object, and an autoencoder-based prediction model training method used therefor.

BACKGROUND OF THE INVENTION

As a method for evaluating the quality of a part manufactured in the industrial field, an NDT is becoming more common. The NDT is classified into a radiographic test, an ultrasonic test and the like.

Since the ultrasonic test uses equipment with a relatively small size, the ultrasonic test is not influenced by an installation and measurement place. Furthermore, since the ultrasonic test has no risk of radiation exposure, the ultrasonic test is a commonly used quality evaluation method.

During an ultrasonic NDT, an ultrasonic transducer is used to emit an ultrasonic wave onto a test object. At this time, the ultrasonic signal emitted from the ultrasonic transducer is reflected from a defect such as void or crack on the rear surface of the test object or inside the test object, and returned to the ultrasonic transducer. The signal which is reflected from the test object and returned to the ultrasonic transducer is referred to as an echo signal.

The ultrasonic signal includes an initial pulse reflecting the characteristic of a sensor, an echo signal primarily reflected from the surface of an object, a defect echo signal reflected from a defect inside the object, and a rear echo signal reflected from the rear side of the object.

In the case of a contact-type ultrasonic test, initial pulses and echo signals primarily reflected from the surface of an object are generated while many of the pulses and the echo signals overlap each other. Thus, the initial pulses and the echo signals may be collectively referred to as the initial pulses.

When a defect is located away from the surface of a test object as illustrated in FIG. 1A, a signal reflected from the defect does not interfere with an initial pulse, which makes it easily to analyze the defect. However, when a defect is located around the surface of a test object as illustrated in FIG. 1B, a signal reflected from the defect interferes with an initial pulse, which makes it difficult to find the presence of or analyze the defect.

As the related art for solving the problem, Japanese Patent Application Laid-Open No. 2021-032754 (Ultrasonic Test Device and Ultrasonic Test Method) discloses a residual-based analysis method for analyzing a defect by comparing a signal measured from a test object with no defect and a signal measured from a test object for emission.

In the residual-based analysis method disclosed in the above-described patent document, however, an error such as signal distortion or phase modulation may occur when a comparison reference signal is measured during a test, and the process of simply comparing signals measured from two test objects has low accuracy.

In order to solve the problems, various signal processing methods such as signal differentiation, low pass filtering, deconvolution, wavelets, and correlation-based approaches are used. Such signal processing methods rely on empirical selections, and require considerable efforts to acquire the optimal result. In most cases, the signal processing methods are mainly used for a dipping method rather than a contact method which is widely used in the field. Thus, the availabilities of the signal processing methods are reduced.

SUMMARY OF THE INVENTION

Technical Problem

The present disclosure has been made to solve the aforementioned problems, and an object of the present disclosure is to provide an ultrasonic NDT method and system using deep learning, which can extract and analyze only a defect signal by accurately removing an initial pulse from an echo signal measured from a test object, and an autoencoder-based prediction model training method used therefor.

Technical Solution

In an embodiment, there is provided a method for training an autoencoder-based prediction model used in an ultrasonic NDT (Non-Destructive Test) method using deep learning.

The method for training an autoencoder-based prediction model may include an ultrasonic signal acquisition step of acquiring a normal signal by transmitting an ultrasonic wave to a test object with no defect, and receiving an ultrasonic wave reflected from the test object; and a prediction model training step of training a prediction model through a process of minimizing a loss function based on Equation 1 below by using the normal signal:

$$L(x_n) = \|x_n - g_\psi(f_\phi(x_n))\|^2 \quad \text{Equation 1,}$$

where $x_n$ represents a measured signal, and $\psi$ and $\phi$ represent training parameters.

The method for training an autoencoder-based prediction model may further include: an ultrasonic signal reacquisition step of acquiring a remeasured signal including a pseudo-normal signal for a portion with no defect and a defect signal for a portion with a defect by transmitting/receiving an ultrasonic wave to/from a test object with a defect; a pseudo-normal signal extraction step of extracting only the pseudo-normal signal from the remeasured signal; and a prediction model retraining step of retraining the prediction model through a process of minimizing a loss function based on Equation 2 below by using the normal signal and the pseudo-normal signal:

$$L(x_n, \widehat{x_n}) = \|x_n - g_{\psi_{re}}(f_{\phi_{re}}(x_n))\|^2 + \|\widehat{x_n} - g_{\psi_{re}}(f_{\phi_{re}}(\widehat{x_n}))\|^2 \quad \text{Equation 2,}$$

where $x_n$ represents the measured signal, $\widehat{x_n}$ represents the remeasured signal, and $\psi_{re}$ and $\phi_{re}$ represent retraining parameters.

The pseudo-normal signal extraction step may further include: a MAD (Mean Absolute Difference) calculation step of calculating an MAD by averaging the absolute values of differences between the normal signal and remeasured signals; a threshold calculation step of calculating a threshold based on Equation 3 below by using the distribution of the MADs; and a pseudo-normal signal determination step of determining that a remeasured signal is the pseudo-normal signal, when the MAD is smaller than the threshold, wherein the MAD indicates how much the remeasured signals differ from the normal signal:

$$\text{threshold} = \mu_{MAD(1)} + \alpha\sigma_{MAD(1)} \quad \text{Equation 3,}$$

where $\mu_{MAD(1)}$ and $\alpha\sigma_{MAD(1)}$ represent the average and standard deviation of a first Gauss distribution of MADs estimated by a Gaussian mixture model, and $\alpha$ represents a critical parameter.

In an embodiment, there is provided an ultrasonic NDT method using deep learning.

The ultrasonic NDT method using deep learning may include an ultrasonic signal acquisition step of acquiring a measured signal by transmitting an ultrasonic wave to a test object, and receiving an ultrasonic wave reflected from the test object; a reference signal prediction step of inputting the measured signal to an autoencoder-based prediction model, and predicting a reference signal which is to be expected to be measured from a test object with no defect; a residual signal calculation step of calculating a residual signal as the absolute value of a difference between the measured signal and the reference signal; and a defect analysis step of analyzing information on a defect contained in the test object by analyzing the residual signal.

The residual signal calculation step may further include: an average calculation step of calculating the average of residual signals; and a scaling step of scaling the magnitude of the residual signal by multiplying the residual signal by the average of the residual signals.

The defect analysis step may further include: an average and TOF (Time Of Flight) calculation step of calculating the average and a TOF from the residual signals; a defect detection step of determining whether a defect is contained in the test object, by using the average distribution; and a defect depth calculation step of calculating the depth of the defect by using the TOF.

In an embodiment, there is provided a computer-readable recording medium in which a program for implementing the above-described method is recorded.

In an embodiment, there is provided an ultrasonic NDT system using deep learning.

The ultrasonic NDT system using deep learning may include an ultrasonic transducer configured to acquire a measured signal by transmitting/receiving an ultrasonic wave to/from a test object while moving in a longitudinal direction of the test object; an autoencoder-based prediction model configured to receive the measured signal, and predict a reference signal which is expected to be measured from a test object with no defect; and a control unit configured to calculate a residual signal as the absolute value of a difference between the measured signal and the reference signal, and analyze information on a defect contained in the test object by analyzing the residual signal.

The prediction model may be trained through a process of minimizing a loss function based on Equation 1 below by using only a normal signal acquired from a test object with no defect:

$$L(x_n) = \|x_n - g_\psi(f_\phi(x_n))\|^2 \quad \text{Equation 1,}$$

where $x_n$ represents a measured signal, and $\psi$ and $\phi$ represent training parameters.

The prediction model may be retrained through a process of extracting a pseudo-normal signal for a portion with no defect from a remeasured signal acquired from a test object with a defect, and minimizing a loss function based on Equation 2 below by using the pseudo-normal signal:

$$L(x_n, \hat{x}_n) = \|x_n - g_{\psi_{re}}(f_{\phi_{re}}(x_n))\|^2 + \|\hat{x}_n - g_{\psi_{re}}(f_{\phi_{re}}(\hat{x}_n))\|^2 \quad \text{Equation 2}$$

where $x_n$ represents the measured signal, $\hat{x}_n$ represents the remeasured signal, and $\psi_{re}$ and $\phi_{re}$ represent retraining parameters.

The pseudo-normal signal may indicate the distribution of MADs calculated by averaging the absolute values of differences between the normal signal and remeasured signals is smaller than a threshold calculated by Equation 3 below, wherein the MAD indicates how much the remeasured signal differs from the normal signal:

$$\text{threshold} = \mu_{MAD(1)} + \alpha\sigma_{MAD(1)} \quad \text{Equation 3,}$$

where $\mu_{MAD(1)}$ and $\alpha\sigma_{MAD(1)}$ represent the average and standard deviation of a first Gauss distribution of MADs estimated by a Gaussian mixture model, and $\alpha$ represents a critical parameter.

The control unit may further include a scaling unit configured to calculate the average of residual signals, and scale the magnitude of the residual signal by multiplying the average by the residual signals.

The control unit may further include: a defect detection unit configured to calculate the average of the residual signals, and determine whether the test object contains a defect, by using the average distribution; and a defect depth calculation unit configured to calculate a TOF from the residual signals, and calculate the depth of the defect by using the TOF.

Advantageous Effects

According to the embodiments of the present disclosure, it is possible to analyze a defect on the surface of a test object despite the interference with an initial signal.

The effects of the present disclosure are not limited to the above-mentioned effects, and the other effects which are not mentioned herein will be clearly understood from the following descriptions by those skilled in the art.

BRIEF DESCRIPTION OF THE DRAWINGS

FIGS. 1A and 1B are diagrams illustrating signals acquired through a conventional ultrasonic NDT (Non-Destructive Test).

DETAILED DESCRIPTION OF THE INVENTION

Figure 2:
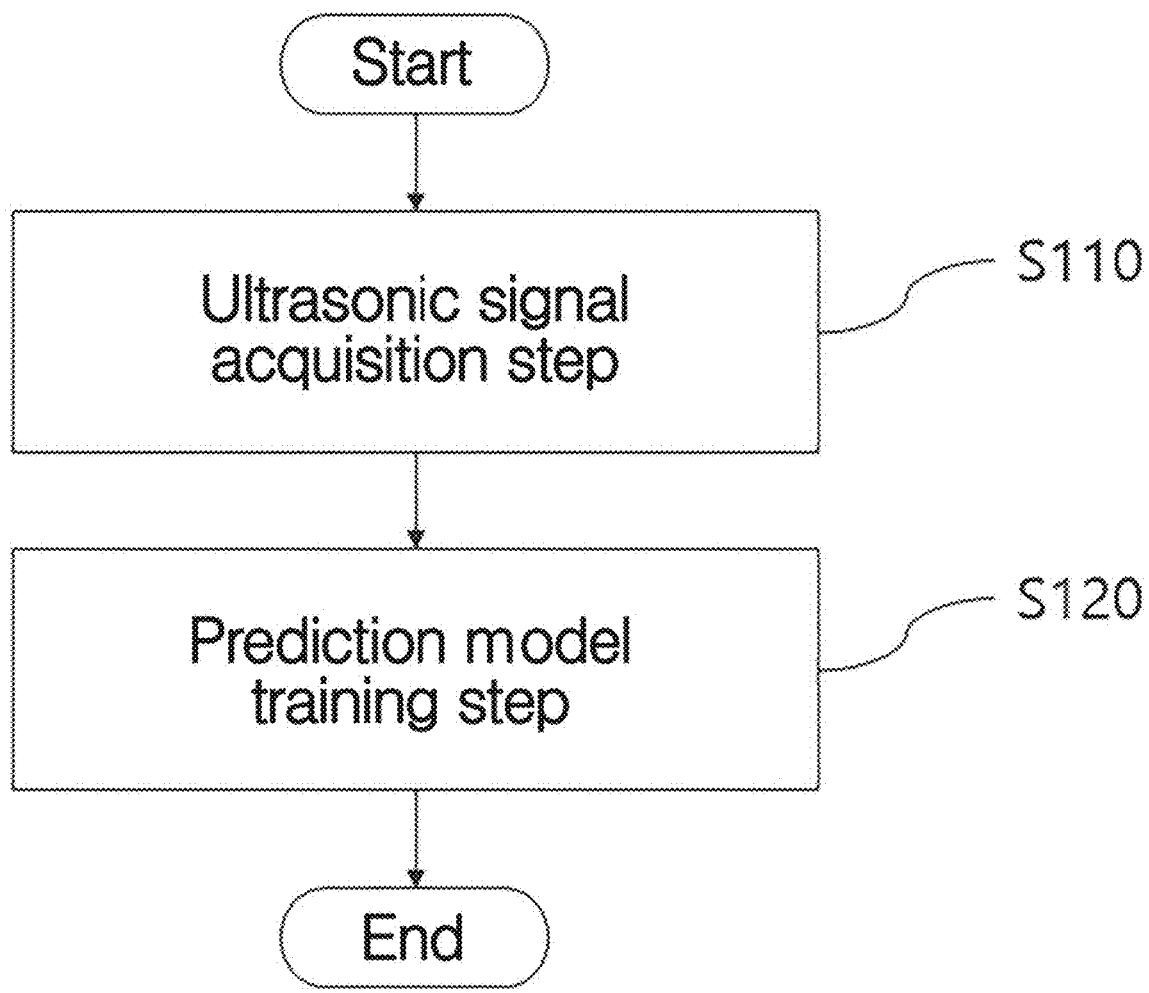
FIG. 2 is a flowchart illustrating an autoencoder-based prediction model training method according to an embodiment of the present disclosure.

Hereafter, embodiments of the present disclosure will be described in detail with reference to the accompanying drawings, such that the present disclosure can be easily carried out by those skilled in the art to which the present disclosure pertains. However, the present disclosure can be embodied in various forms, and are not limited to the embodiments. In the drawings, components which have nothing to do with the description will be omitted in order to clearly describe the present disclosure. Throughout the specification, the same components will be represented by like reference numerals.

Terms used in this specification will be briefly described, and the present disclosure will be then described in detail.

In this specification, general terms which are widely used at the moment are selected as the terms used herein in consideration of functions in the present disclosure. However, the terms may be changed depending on an intention of a technician in this field or an appearance of a precedent or new technique. In a specific case, a term selected by the present applicant may be used. In this case, the meaning of the term will be described in detail in the corresponding part of this specification. Therefore, the definitions of the terms used herein should made by the meanings of the terms based on the overall disclosures set forth herein, not the names of the terms.

Throughout the specification, when an element "includes" a component, it may indicate that the element does not exclude another component unless referred to the contrary, but can further include another component. The terms such as " ... unit" and "module" in this specification may indicate a unit for processing one or more functions or operations, and may be embodied in hardware, software or a combination of hardware and software. Throughout the specification, when one element is referred to as being "connected" to another element, it may not only indicate that the former element is "directly connected" to the latter element, but also indicate that the former element is connected to the latter element "with another element interposed therebetween".

Hereafter, the present disclosure will be described in detail with reference to the accompanying drawings.

FIG. 2 is a flowchart illustrating an autoencoder-based prediction model training method according to an embodiment of the present disclosure.

Figure 3A:
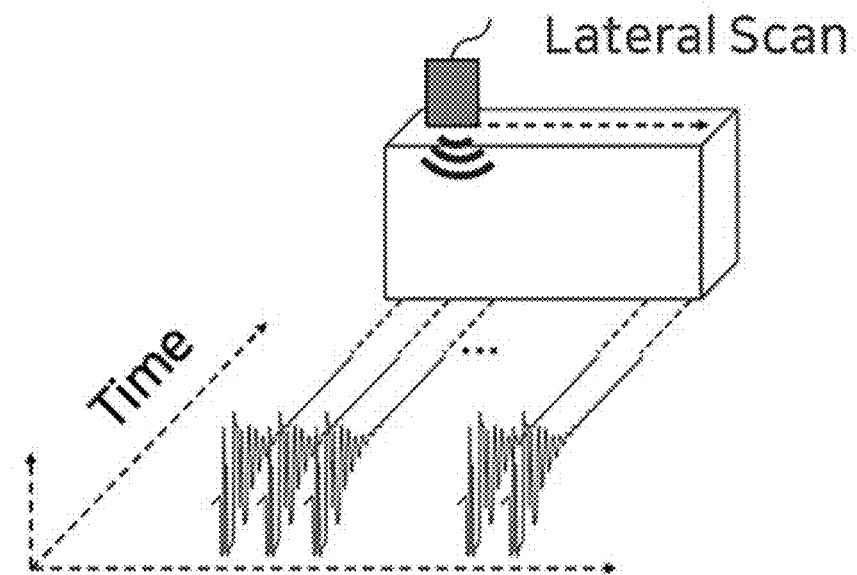
FIG. 3A is a diagram illustrating an ultrasonic signal acquisition step in the autoencoder-based prediction model training method according to the embodiment of the present disclosure.
Figure 3B:
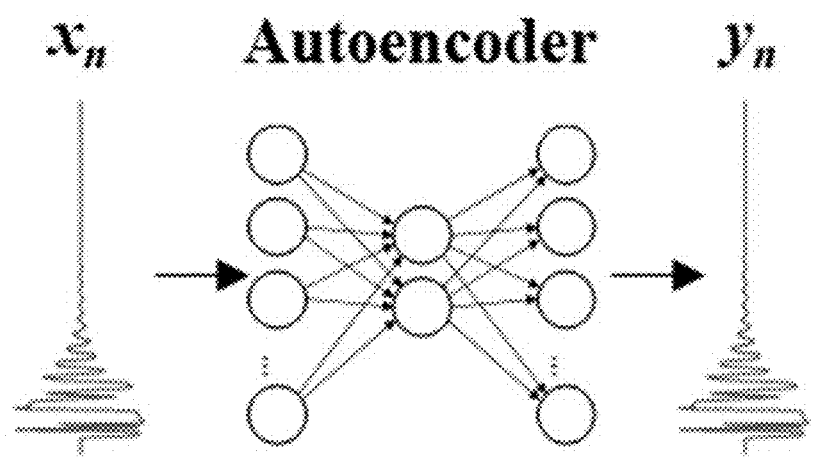
FIG. 3B is a diagram illustrating a prediction model training step in the autoencoder-based prediction model training method.

FIG. 3A is a diagram illustrating an ultrasonic signal acquisition step S110 in the autoencoder-based prediction model training method according to the embodiment of the present disclosure, and FIG. 3B is a diagram illustrating a prediction model training step S120 in the autoencoder-based prediction model training method.

An autoencoder is a kind of ANN (Artificial Neural Network) composed of two networks, i.e. an encoder and a decoder. The encoder compresses an input signal into a latent variable, and the decoder reconfigures the input signal from the compressed latent variable.

The encoder and the decoder may be implemented as expressed by Equations 1 and 2, respectively.

$$z = f_\phi(x) = \sigma_e(W_e x + b_e) \quad \text{[Equation 1]}$$

$$y = g_\psi(z) = \sigma_d(W_d z + b_d) \quad \text{[Equation 2]}$$

Here, x represents a signal inputted to the encoder, y represents a signal outputted from the decoder, z represents a latent variable, $f_\phi$ represents a transfer function of the encoder, $g_\psi$ represents a transfer function of the decoder, σ represents an activation function, W represents a weight, b represents a bias, and e and d represent the encoder and the decoder, respectively.

The prediction model training method according to the embodiment of the present disclosure may use a single-layer autoencoder for simple and rapid implementation.

Referring to FIG. 2, an ultrasonic NDT (Non-Destructive Test) method using deep learning according to an embodiment of the present disclosure may include an ultrasonic signal acquisition step S110 and a prediction model training step S120.

As illustrated in FIG. 3A, in the ultrasonic signal acquisition step S110, an ultrasonic transducer 100 transmits an ultrasonic wave to a test object with no defect, and receives an ultrasonic wave reflected from the test object, thereby acquiring a normal signal.

As illustrated in FIG. 3B, in the prediction model training step S120, a prediction model 200 is trained through a process of minimizing a loss function based on Equation 3 below by using the normal signal. In FIG. 3B, $y_n$ represents a reference signal predicted by the prediction model 200.

$$L(x_n) = \|x_n - g_\psi(f_\phi(x_n))\| \quad \text{[Equation 3]}$$

Here, $x_n$ represents a measured signal, and ψ and φ represent training parameters.

Figure 4:
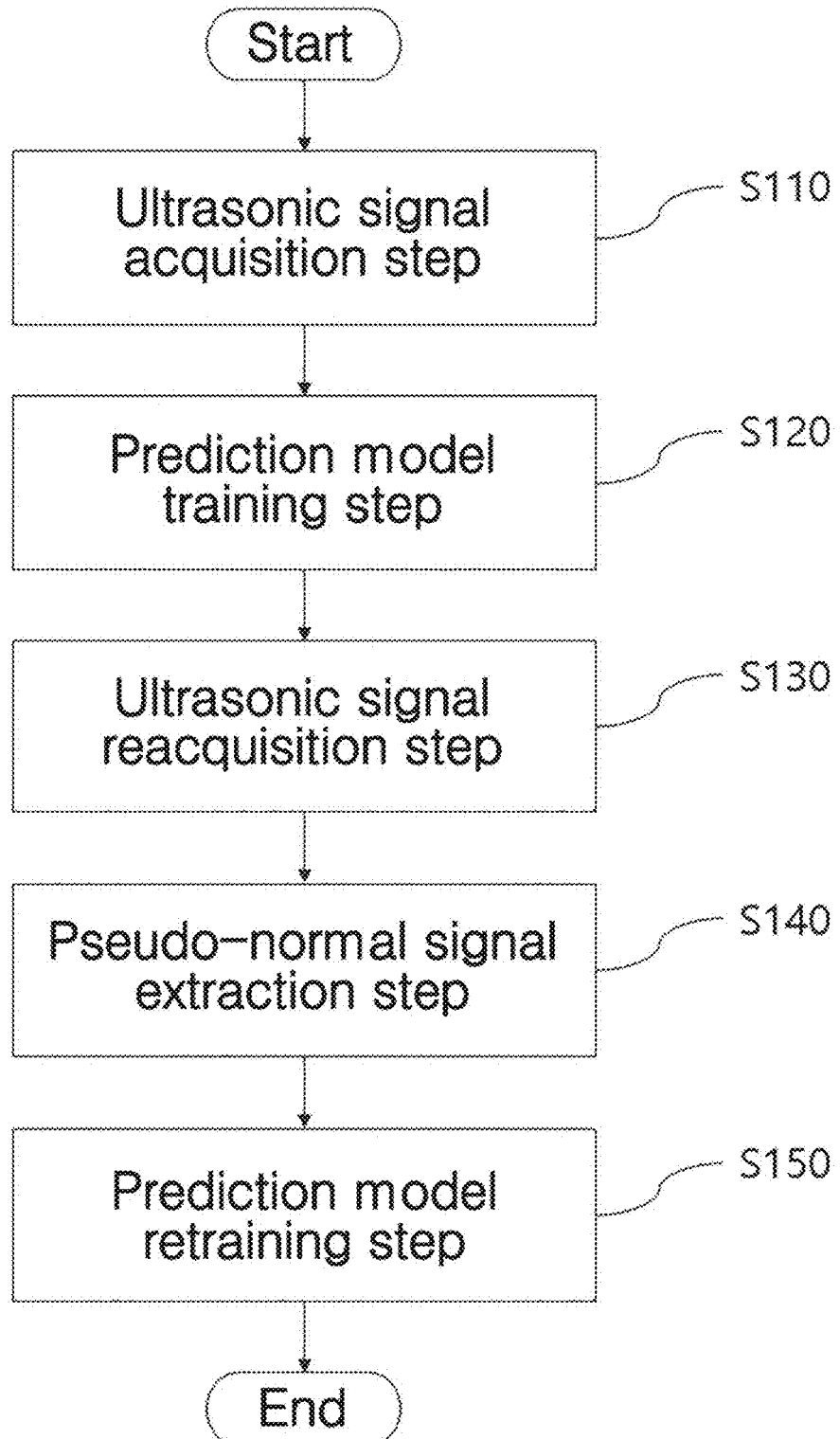
FIG. 4 is a flowchart illustrating an autoencoder-based prediction model training method according to another embodiment of the present disclosure.

FIG. 4 is a flowchart illustrating an autoencoder-based prediction model training method according to another embodiment of the present disclosure.

Figure 5:
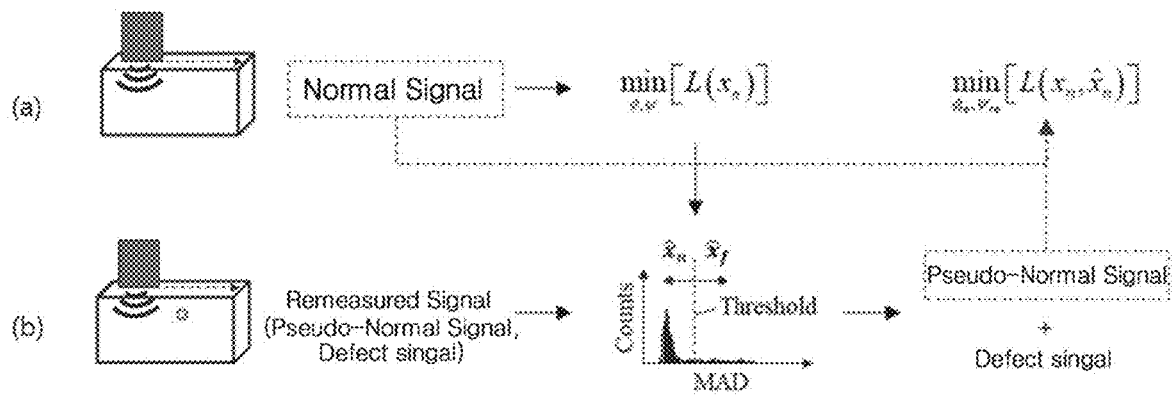
FIG. 5 is a diagram illustrating processes of the autoencoder-based prediction model training method according to the another embodiment of the present disclosure.

FIG. 5 illustrate processes of the autoencoder-based prediction model training method according to the another embodiment of the present disclosure.

Referring to FIGS. 4 and 5, the autoencoder-based prediction model training method according to the embodiment of the present disclosure includes an ultrasonic signal acquisition step S110, a prediction model training step S120, an ultrasonic signal reacquisition step S130, a pseudo-normal signal extraction step S140, and a prediction model retraining step S150.

As illustrated in portion (a) of FIG. 5, the prediction model training method and the ultrasonic signal acquisition step S110 may be performed in the same manner as described with reference to FIGS. 2 and 3.

As illustrated in portion (b) of FIG. 5, the ultrasonic signal reacquisition step S130 includes transmitting, by the ultrasonic transducer 100, an ultrasonic wave to a test object with a defect, and receiving an ultrasonic wave reflected from the test object with a defect, thereby acquiring a remeasured signal including a pseudo-normal signal for a portion with no defect and a defect signal for a portion with a defect.

As illustrated in portion (b) of FIG. 5, the pseudo-normal signal extraction step S140 includes extracting only a pseudo-normal signal from the remeasured signal.

As illustrated in portion (b) of FIG. 5, the prediction model retraining step S150 includes retraining the prediction model 200 through a process of minimizing a loss function based on Equation 4 below by using the normal signal and the pseudo-normal signal.

$$L(x_n, \hat{x}_n) = \|x_n - g_{\psi_{re}}(f_{\phi_{re}}(x_n))\|^2 + \|\hat{x}_n - g_{\psi_{re}}(f_{\phi_{re}}(\hat{x}_n))\|^2 \quad \text{[Equation 4]}$$

Here, $x_n$ represents a measured signal, $\hat{x}_n$ represents a remeasured signal, and $\psi_{re}$ and $\phi_{re}$ represent retraining parameters.

Figure 6:
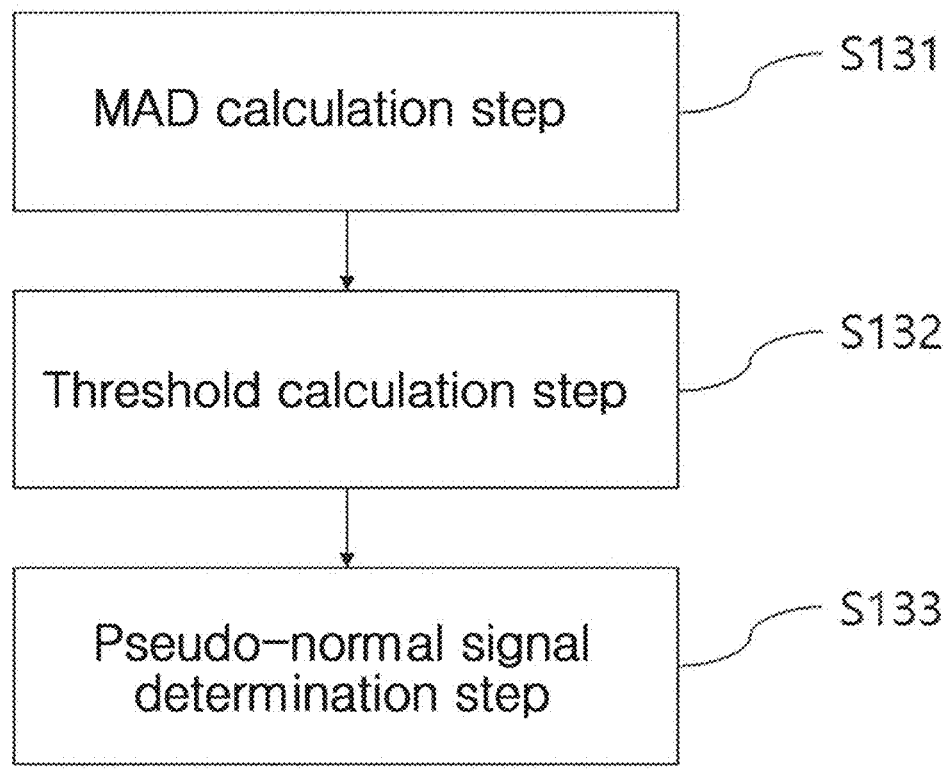
FIG. 6 is a flowchart illustrating a pseudo-normal signal extraction step in the autoencoder-based prediction model training method according to the another embodiment of the present disclosure.

FIG. 6 is a flowchart illustrating the pseudo-normal signal extraction step S140 in the autoencoder-based prediction model training method according to the another embodiment of the present disclosure.

Figure 7:
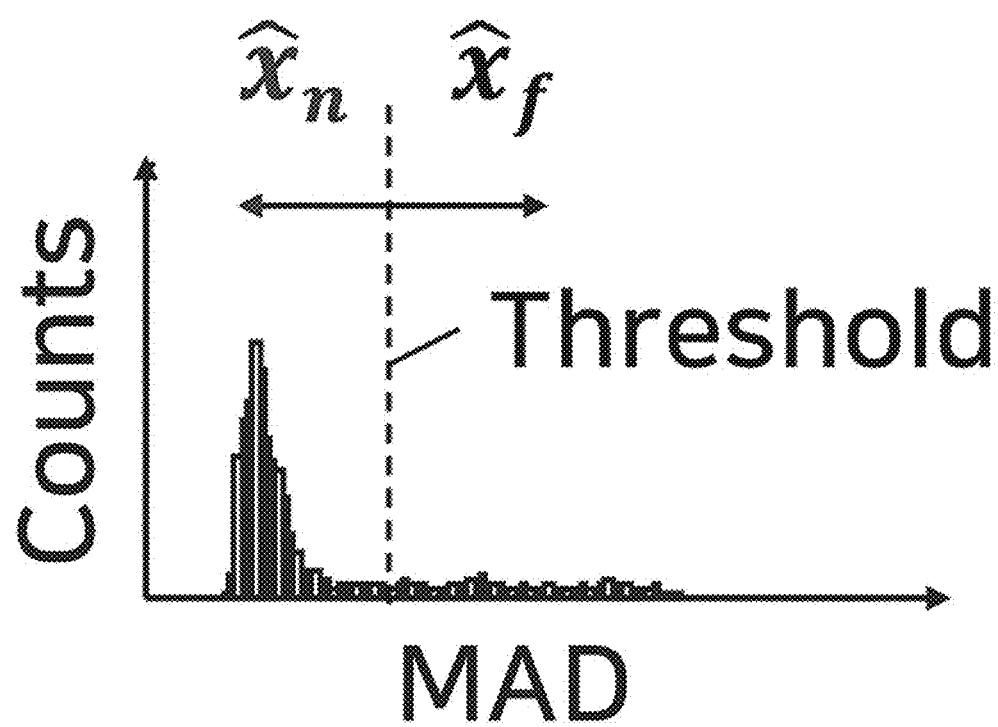
FIG. 7 is a histogram of MAD (Mean Absolute Difference) distributions calculated in a MAD calculation step according to the another embodiment of the present disclosure.

FIG. 7 is a histogram of MAD (Mean Absolute Difference) distributions calculated in a MAD calculation step S131 according to the another embodiment of the present disclosure.

Referring to FIG. 6, the pseudo-normal signal extraction step S140 of the autoencoder-based prediction model training method according to the another embodiment of the present disclosure includes the MAD calculation step S131, a threshold calculation step S132, and a pseudo-normal signal determination step S133.

In the MAD calculation step S131, a control unit 300 calculates an MAD by averaging the absolute values of differences between a normal signal and remeasured signals. At this time, the MAD represents how much the remeasured signals differ from the normal signal.

In the threshold calculation step S132, the control unit 300 calculates a threshold based on Equation 5 below by using MAD distribution.

$$\text{threshold} = \mu_{MAD(1)} + \alpha\sigma_{MAD(1)} \quad \text{[Equation 5]}$$

Here, $\mu_{MAD(1)}$ and $\alpha\sigma_{MAD(1)}$ represent the average and standard deviation of a first Gauss distribution of MADs estimated by a Gaussian mixture model, and $\alpha$ represents a critical parameter.

In the pseudo-normal signal determination step S133, the control unit 300 determines that a remeasured signal is a pseudo-normal signal, when the MAD is smaller than the threshold.

When the normal signal is subtracted from a defect signal measured at a portion with a defect, the defect signal has a relative large MAD because a signal reflected from the defect is included in the defect signal. However, when the normal signal is subtracted from a pseudo-normal signal measured at a portion with no defect, the defect signal has a relatively small MAD because all signals except an error will be removed.

That is, since the MAD of the defect signal will be larger than the MAD of the pseudo-normal signal, signals having a smaller MAD than the threshold are pseudo-normal signals measured at the portion with no defect, as illustrated in FIG. 7.

Figure 8:
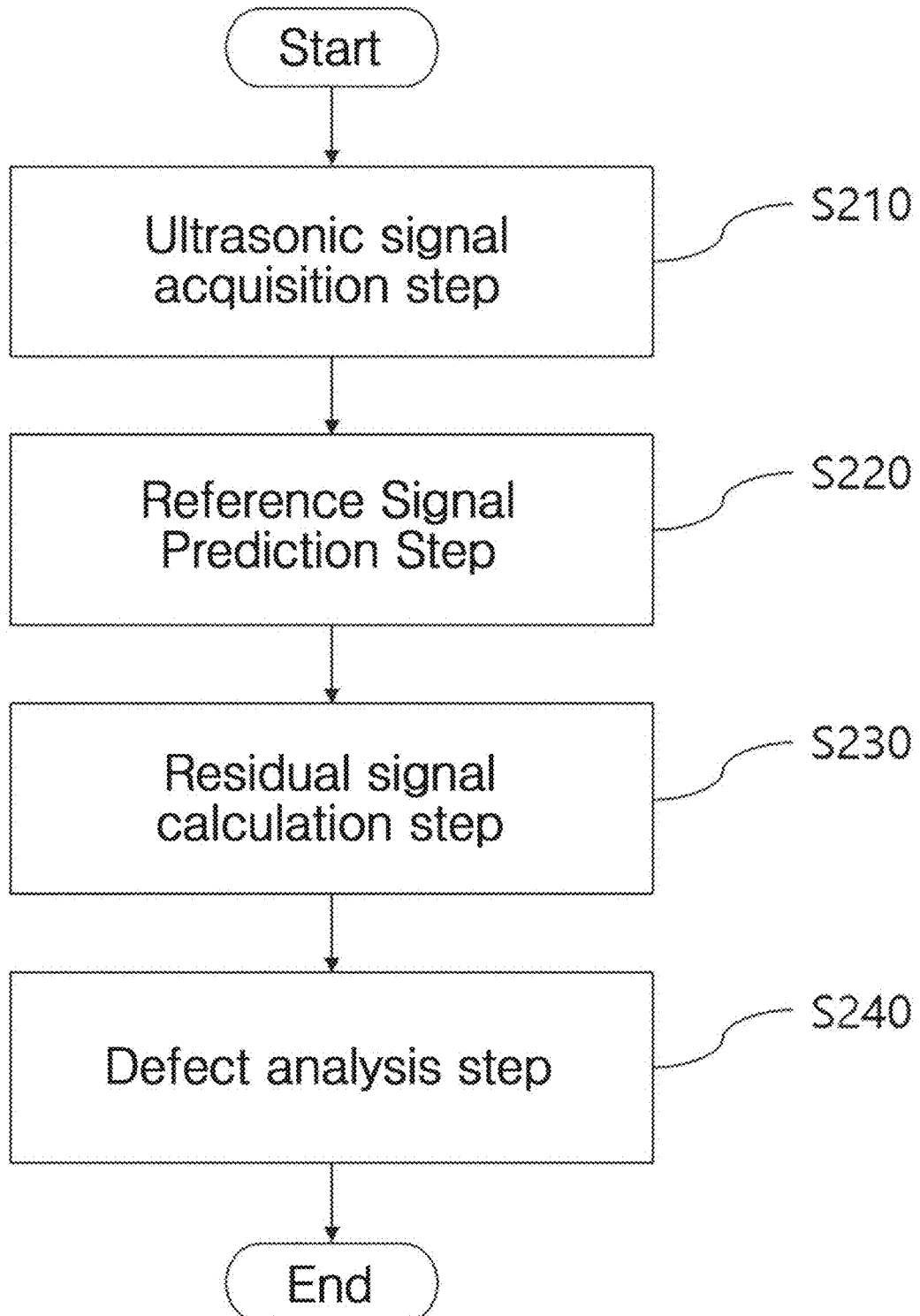
FIG. 8 is a flowchart illustrating an ultrasonic NDT method using deep learning according to an embodiment of the present disclosure.
Figure 9:
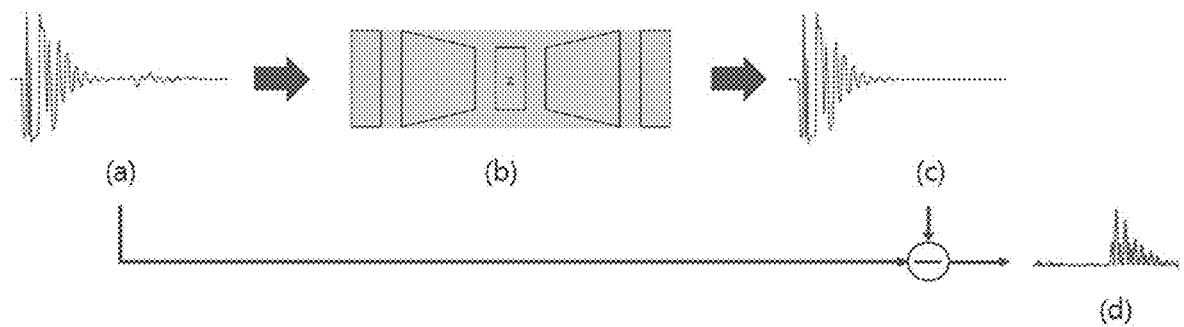
FIG. 9 is a diagram illustrating the ultrasonic NDT method using deep learning according to the embodiment of the present disclosure.

FIG. 8 is a flowchart illustrating an ultrasonic NDT method using deep learning according to an embodiment of the present disclosure, and FIG. 9 is a diagram illustrating the ultrasonic NDT method using deep learning according to the embodiment of the present disclosure.

Referring to FIGS. 8 and 9, the ultrasonic NDT method using deep learning according to the embodiment of the present disclosure includes an ultrasonic signal acquisition step S210, a reference signal prediction step S220, a residual signal calculation step S230, and a defect analysis step S240.

In the ultrasonic signal acquisition step S210, the ultrasonic transducer 100 transmits an ultrasonic wave to a test object, and receive an ultrasonic wave reflected from the test object, thereby acquiring a measured signal.

In the reference signal prediction step S220, the control unit 300 inputs the measured signal to the autoencoder-based prediction model 200, and predicts a reference signal which is expected to be measured from a test object with no defect.

In the residual signal calculation step S230, the control unit 300 calculates a residual signal as the absolute value of a difference between the measured signal and the reference signal.

In the defect analysis step S240, the control unit 300 analyzes information on the defect present in the test object by analyzing the residual signal.

Figure 10:
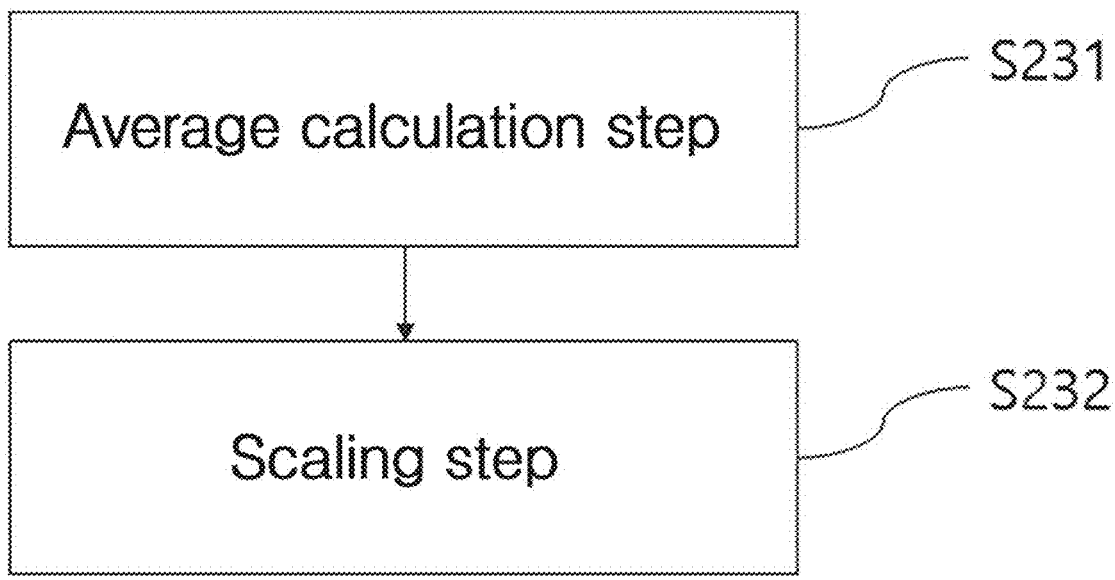
FIG. 10 is a flowchart illustrating a residual signal calculation step in the ultrasonic NDT method using deep learning according to the embodiment of the present disclosure.

FIG. 10 is a flowchart illustrating the residual signal calculation step S230 in the ultrasonic NDT method using deep learning according to the embodiment of the present disclosure.

Referring to FIG. 10, the residual signal calculation step S230 in the ultrasonic NDT method using deep learning according to the embodiment of the present disclosure may further include an average calculation step S231 and a scaling step S232.

In the average calculation step S231, a scaling unit 310 calculates the average of residual signals.

In the scaling step S232, the scaling unit 310 scales the magnitude of the residual signal by multiplying the residual signal by the average.

Figure 11:
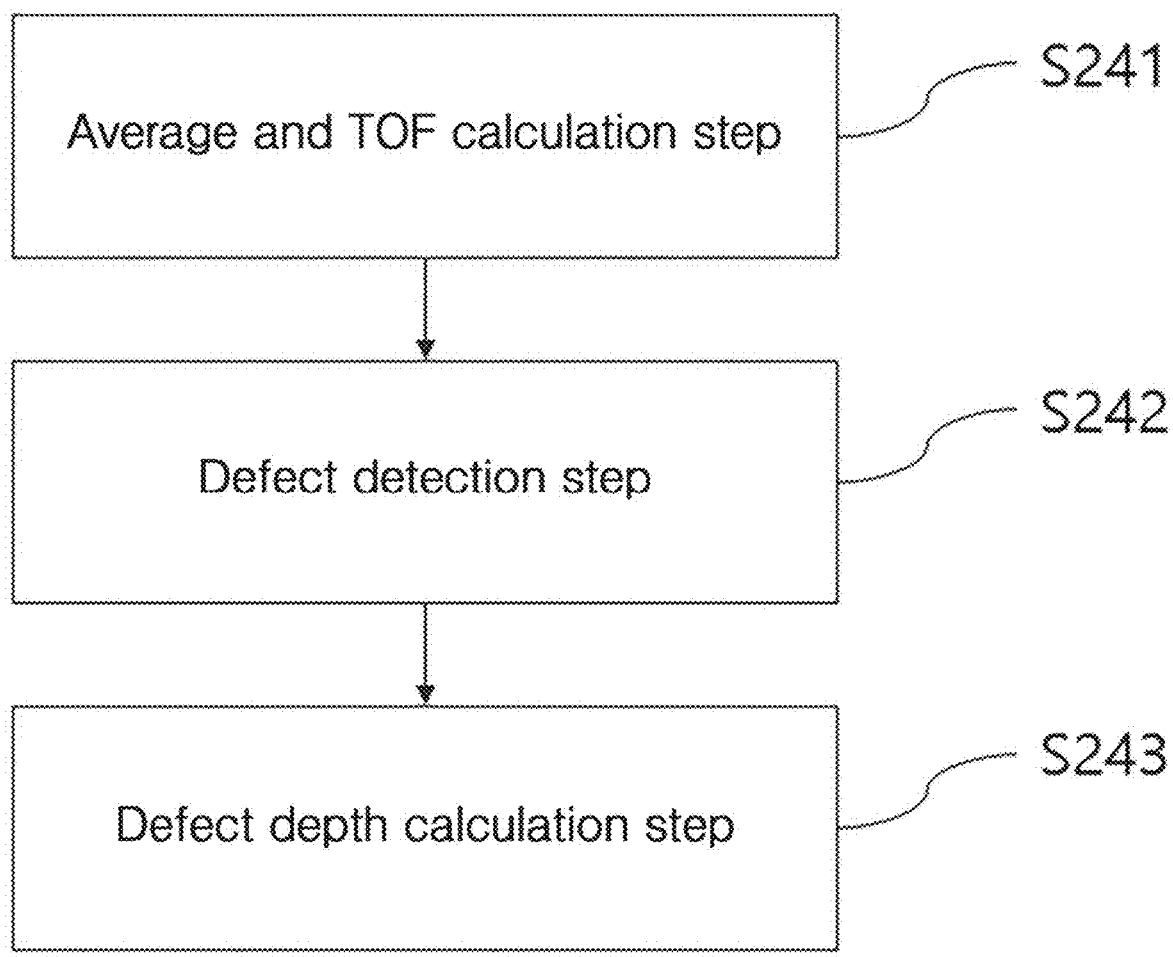
FIG. 11 is a flowchart illustrating a defect analysis step in the ultrasonic NDT method using deep learning according to the embodiment of the present disclosure.
Figure 12A:
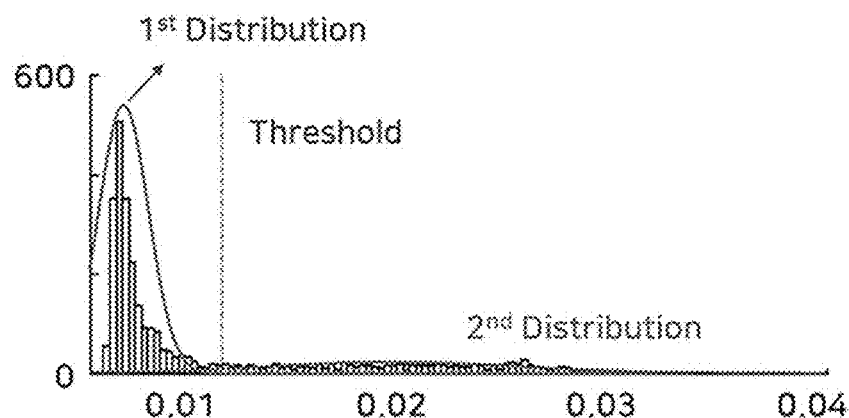
FIG. 12A is a histogram of the average distributions of residual signals calculated in the defect analysis step.
Figure 12B:
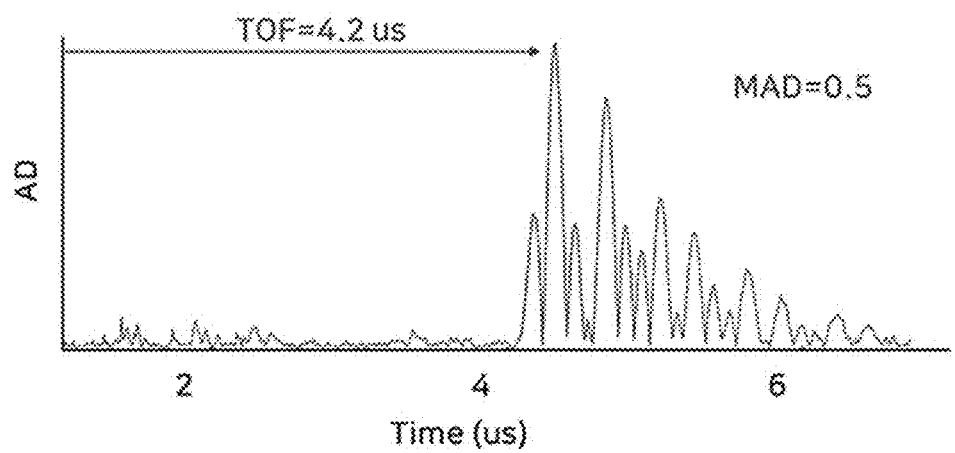
FIG. 12B is a diagram illustrating an average and TOF (Time Of Flight) calculated from the residual signals.

FIG. 11 is a flowchart illustrating a defect analysis step S240 in the ultrasonic NDT method using deep learning according to the embodiment of the present disclosure, FIG. 12A is a histogram of the average distributions of residual signals, calculated in the defect analysis step S240, and FIG. 12B is a diagram illustrating an average (MAD) and TOF (Time Of Flight) calculated from the residual signals.

Referring to FIG. 11, the defect analysis step S240 in the ultrasonic NDT method using deep learning according to the embodiment of the present disclosure may further include an average and TOF calculation step S241, a defect detection step S242, and a defect depth calculation step S243.

In the average and TOF calculation step S241, a defect detection unit 320 and a defect depth calculation unit 330 calculate the average and the TOF from the residual signals, respectively.

In the defect detection step S242, the defect detection unit 320 determines whether the test object contains a defect, by using the average distribution.

A residual signal is obtained by subtracting the reference signal from a measured signal. Thus, when a specific signal remains in the residual signal, it may indicate that the specific signal is a signal generated by the defect. Therefore, the MAD of the residual signals may include information on the size or intensity of the defect.

Furthermore, when the MAD of the residual signal is larger than the threshold as described with reference to FIG. 6, it may indicate that the test object contains a defect. That is because, when the test object contains a defect, a signal reflected by the defect will remain in the residual signal.

The defect depth calculation step S243 may further include a defect depth calculation step S243 of calculating the depth of the defect by using the TOF.

The TOF may indicate the time required until an ultrasonic wave transmitted from the ultrasonic transducer 100 propagates through the test object and returns to the ultrasonic transducer 100. When the TOF increases, it may be analyzed that the defect is located away from the surface of the test object.

The present disclosure may be provided as a computer readable recording medium for implementing the method of FIGS. 1 to 12 as a program. In other words, the above-described method may be created as a program which can be executed in a computer, and implemented in a general-purpose digital computer that operates the program using a computer-readable medium. The structure of data used in the above-described method may be recorded into a computer readable medium through various means.

However, it should not be understood that the recording medium for recording an executable computer program or code for performing the various methods of the present disclosure includes temporary targets such as carrier waves or signals. Examples of the computer-readable medium may include storage media such as magnetic storage media (ex. ROM, floppy disk, hard disk and the like) and optical readable media (ex. CD ROM, DVD and the like).

Figure 13:
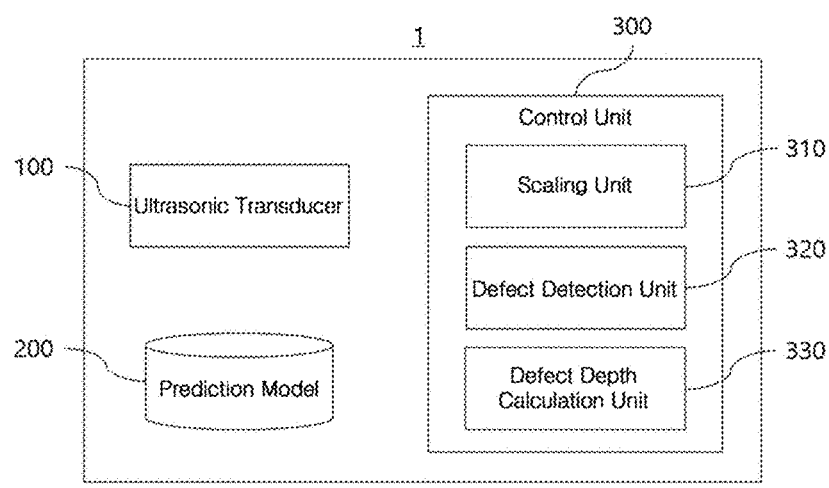
FIG. 13 is a block diagram illustrating an ultrasonic NDT system using deep learning according to an embodiment of the present disclosure.

FIG. 13 is a block diagram illustrating an ultrasonic NDT system using deep learning according to an embodiment of the present disclosure.

Referring to FIG. 13, the ultrasonic NDT system using deep learning according to the embodiment of the present disclosure may include the ultrasonic transducer 100, the autoencoder-based prediction model 200, and the control unit 300. The ultrasonic transducer 100 may acquire a measured signal by transmitting/receiving an ultrasonic wave to/from a test object while moving in the longitudinal direction of the test object. The autoencoder-based prediction model 200 may receive the measured signal, and predict a reference signal which is expected to be measured from a test object with no defect. The control unit 300 may calculate a residual signal as the absolute value of a difference between the measured signal and the reference signal, and analyze information on a defect contained in the test object by analyzing the residual signal.

In an embodiment, the prediction model 200 may be trained through a process of minimizing a loss function based on Equation 6 below by using only a normal signal acquired from a test object with no defect.

$$L(x_n)=\|x_n-g_\psi(f_\phi(x_n))\|^2 \qquad \text{[Equation 6]}$$

Here, $x_n$ represents a measured signal, and $\psi$ and $\phi$ represent training parameters.

In an embodiment, the prediction model 200 may be retrained through a process of extracting a pseudo-normal signal for a portion with no defect from a remeasured signal acquired from a test object with a defect, and minimizing a loss function based on Equation 7 below by using the pseudo-normal signal.

$$L(x_n, \widehat{x_n})=\|x_n-g_{\psi_{re}}(f_{\phi_{re}}(x_n))\|^2+\|\widehat{x_n}-g_{\psi_{re}}(f_{\phi_{re}}(\widehat{x_n}))\|^2 \qquad \text{[Equation 7]}$$

Here, $x_n$ represents a measured signal, $\widehat{x_n}$ represents a remeasured signal, and $\psi_{re}$ and $\phi_{re}$ represent retraining parameters.

In an embodiment, the pseudo-normal signal may indicate that the distribution of MADs calculated by averaging the absolute values of differences between the normal signal and remeasured signals is smaller than a threshold calculated through Equation 8 below, and the MAD may indicate how much the remeasured signals differ from the normal signal $$\text{threshold}=\mu_{MAD(1)}+\alpha\sigma_{MAD(1)} \qquad \text{[Equation 8]}$$

Here, $\mu_{MAD(1)}$ and $\alpha\sigma_{MAD(1)}$ represent the average and standard deviation of a first Gauss distribution of MADs estimated by a Gaussian mixture model, and $\alpha$ represents a critical parameter.

In an embodiment, the control unit 300 may further include the scaling unit 310 configured to calculate the average of residual signals, and scale the magnitude of the residual signal by multiplying the residual signal by the average.

In an embodiment, the control unit 300 may further include the defect detection unit 320 and the defect depth calculation unit 330. The defect detection unit 320 may calculate the average of residual signals, and determine whether the test object contains a defect, by using the average distribution, and the defect depth calculation unit 330 may calculate a TOF from the residual signal, and calculate the depth of the defect by using the TOF.

The contents of the above-described method may be applied to the system according to the embodiment of the present disclosure. Therefore, in relation to the system, the descriptions of the same contents as the contents on the above-described method are omitted herein.

The descriptions of the present disclosure are only examples, and it should be understood that the present disclosure can be easily modified into other specific forms by those skilled in the art to which the present disclosure pertains, without changing the technical spirit or necessary features of the present disclosure. Therefore, it should be understood that the above-described embodiments are only illustrative in all aspects and are not limitative. For example, components described in a singular form may be distributed and embodied. Similarly, distributed components may be embodied in a coupled form.

The scope of the present disclosure is defined by the following claims rather than the detailed descriptions, and it should be construed that the meaning and scope of the claims and all changes or modifications derived from the equivalents thereof are included in the scope of the present disclosure.

The scope of the present disclosure is defined by the following claims rather than by the detailed description of the disclosure. It should be construed that all modifications and embodiments conceived from the meaning and scope of the claims and their equivalents are included in the scope of the present disclosure.

The invention claimed is:

1. A method for training an autoencoder-based prediction model used in an ultrasonic NDT (Non-Destructive Test) method using deep learning, the method comprising:
   an ultrasonic signal acquisition step of acquiring a normal signal by transmitting an ultrasonic wave to a test object with no defect, and receiving an ultrasonic wave reflected from the test object;
   a prediction model training step of training a prediction model through a process of minimizing a loss function based on Equation 1 below by using the normal signal:

$$L(x_n)=\|x_n-g_\psi(f_\phi(x_n))\|^2 \qquad \text{Equation 1,}$$

where $x_n$ represents a measured signal, $\psi$ and $\phi$ represent training parameters, $f_\phi$ represents a transfer function of an encoder, and $g_\psi$ represents a transfer function of a decoder;

an ultrasonic signal reacquisition step of acquiring a remeasured signal including a pseudo-normal signal for a portion with no defect and a defect signal for a portion with a defect by transmitting/receiving an ultrasonic wave to/from a test object with a defect;

a pseudo-normal signal extraction step of extracting only the pseudo-normal signal from the remeasured signal; and a prediction model retraining step of retraining the prediction model through a process of minimizing a loss function based on Equation 2 below by using the normal signal and the pseudo-normal signal:

$$L(x_n,\widehat{x_n})=\|x_n-g_{\psi_{re}}(f_{\phi_{re}}(x_n))\|^2+\|\widehat{x_n}-g_{\psi_{re}}(f_{\phi_{re}}(\widehat{x_n}))\|^2 \quad \text{Equation 2,}$$

where $x_n$ represents the measured signal, $\widehat{x_n}$ represents the remeasured signal, $\psi_{re}$ and $\phi_{re}$ represent retraining parameters, $f_{\phi_{re}}$ represents a transfer function of the encoder, and $g_{\psi_{re}}$ represents a transfer function of the decoder;

wherein the pseudo-normal signal extraction step further comprises:

a MAD (Mean Absolute Difference) calculation step of calculating an MAD by averaging absolute values of differences between the normal signal and remeasured signals;

a threshold calculation step of calculating a threshold based on Equation 3 below by using a distribution of the MADs; and a pseudo-normal signal determination step of determining that a remeasured signal is the pseudo-normal signal, when the MAD is smaller than the threshold, wherein the MAD indicates how much the remeasured signals differ from the normal signal:

$$\text{threshold}=\mu_{MAD(1)}+\alpha\sigma_{MAD(1)} \quad \text{Equation 3,}$$

where $\mu_{MAD}(1)$ and $\alpha\sigma_{MAD}(1)$ represent an average and standard deviation of a first Gauss distribution of MADs estimated by a Gaussian mixture model, and $\alpha$ represents a critical parameter.

2. An ultrasonic NDT method using deep learning, comprising:

an ultrasonic signal acquisition step of acquiring a measured signal by transmitting an ultrasonic wave to a test object, and receiving an ultrasonic wave reflected from the test object;

a reference signal prediction step of inputting the measured signal to an autoencoder-based prediction model, and predicting a reference signal which is to be expected to be measured from a test object with no defect;

a residual signal calculation step of calculating a residual signal as an absolute value of a difference between the measured signal and the reference signal; and a defect analysis step of analyzing information on a defect contained in the test object by analyzing the residual signal;

wherein the prediction model is trained through a process of minimizing a loss function based on Equation 1 below by using only a normal signal acquired from a test object with no defect:

$$L(x_n)=\|x_n-g_\psi(f_\phi(x_n))\|^2 \quad \text{Equation 1,}$$

where $x_n$ represents a measured signal, $\psi$ and $\phi$ represent training parameters, $f_\phi$ represents a transfer function of an encoder, and $g_\psi$ represents a transfer function of a decoder;

wherein the prediction model is retrained through a process of extracting a pseudo-normal signal for a portion with no defect from a remeasured signal acquired from a test object with a defect, and minimizing a loss function based on Equation 2 below by using the pseudo-normal signal:

$$L(x_n,\widehat{x_n})=\|x_n-g_{\psi_{re}}(f_{\phi_{re}}(x_n))\|^2+\|\widehat{x_n}-g_{\psi_{re}}(f_{\phi_{re}}(\widehat{x_n}))\|^2 \quad \text{Equation 2,}$$

where $x_n$ represents the measured signal, $\widehat{x_n}$ represents the remeasured signal, $\psi_{re}$ and $\phi_{re}$ represent retraining parameters, $f_{\phi_{re}}$ represents a transfer function of the encoder, and $g_{\psi_{re}}$ represents a transfer function of the decoder;

wherein the pseudo-normal signal indicates a distribution of MADs (Mean Absolute Differences) calculated by averaging the absolute values of differences between the normal signal and remeasured signals is smaller than a threshold calculated by Equation 3 below;

wherein the MAD indicates how much the remeasured signals differ from the normal signal:

$$\text{threshold}=\mu_{MAD(1)}+\alpha\sigma_{MAD(1)} \quad \text{Equation 3,}$$

where $\mu_{MAD}(1)$ and $\alpha\sigma_{MAD}(1)$ represent an average and standard deviation of a first Gauss distribution of MADs estimated by a Gaussian mixture model, and $\alpha$ represents a critical parameter.

3. The ultrasonic NDT method of claim 2, wherein the residual signal calculation step further comprises:

an average calculation step of calculating the average of residual signals; and a scaling step of scaling a magnitude of the residual signal by multiplying the residual signal by the average of the residual signals.

4. The ultrasonic NDT method of claim 2, wherein the defect analysis step further comprises:

an average and TOF (Time Of Flight) calculation step of calculating the average and a TOF from the residual signals;

a defect detection step of determining whether a defect is contained in the test object, by using an average distribution; and a defect depth calculation step of calculating the depth of the defect by using the TOF.

5. A computer-readable recording medium in which a program for implementing the method of claim 1 is recorded.

6. An ultrasonic NDT system using deep learning, comprising:

an ultrasonic transducer configured to acquire a measured signal by transmitting/receiving an ultrasonic wave to/from a test object while moving in a longitudinal direction of the test object;

an autoencoder-based prediction model configured to receive the measured signal, and predict a reference signal which is expected to be measured from a test object with no defect; and a control unit configured to calculate a residual signal as an absolute value of a difference between the measured signal and the reference signal, and analyze information on a defect contained in the test object by analyzing the residual signal;

wherein the prediction model is trained through a process of minimizing a loss function based on Equation 1 below by using only a normal signal acquired from a test object with no defect:

$$L(x_n) = \|x_n - g_\psi(f_\phi(x_n))\|^2 \qquad \text{Equation 1,}$$

where $x_n$ represents a measured signal, and $\psi$ and $\phi$ represent training parameters, $f_\phi$ represents a transfer function of an encoder, and $g_\psi$ represents a transfer function of a decoder;

wherein the prediction model is retrained through a process of extracting a pseudo-normal signal for a portion with no defect from a remeasured signal acquired from a test object with a defect, and minimizing a loss function based on Equation 2 below by using the pseudo-normal signal:

$$L(x_n, \widehat{x_n}) = \|x_n - g_{\psi_{re}}(f_{\phi_{re}}(x_n))\|^2 + \|\widehat{x_n} - g_{\psi_{re}}(f_{\phi_{re}}(\widehat{x_n}))\|^2 \qquad \text{Equation 2,}$$

where $x_n$ represents the measured signal, $\widehat{x_n}$ represents the remeasured signal, $\psi_{re}$ and $\phi_{re}$ represent retraining parameters, $f_{\phi_{re}}$ represents a transfer function of the encoder, and $g_{\psi_{re}}$ represents a transfer function of the decoder;

wherein the pseudo-normal signal indicates a distribution of MADs (Mean Absolute Differences) calculated by averaging the absolute values of differences between the normal signal and remeasured signals is smaller than a threshold calculated by Equation 3 below, wherein the MAD indicates how much the remeasured signal differs from the normal signal:

$$\text{threshold} = \mu_{MAD(1)} + \alpha\sigma_{MAD(1)} \qquad \text{Equation 3,}$$

where $\mu_{MAD}(1)$ and $\alpha\sigma_{MAD}(1)$ represent an average and standard deviation of a first Gauss distribution of MADs estimated by a Gaussian mixture model, and a represents a critical parameter.

7. The ultrasonic NDT system of claim 6, wherein the control unit further comprises a scaling unit configured to calculate an average of residual signals, and scale a magnitude of the residual signal by multiplying the average by the residual signals.

8. The ultrasonic NDT system of claim 6, wherein the control unit further comprises:
   a defect detection unit configured to calculate an average of the residual signals, and determine whether the test object contains a defect, by using an average distribution; and
   a defect depth calculation unit configured to calculate a TOF from the residual signals, and calculate the depth of the defect by using the TOF.

\* \* \* \* \*